United States Patent
Lee et al.

(10) Patent No.: US 10,530,174 B2
(45) Date of Patent: Jan. 7, 2020

(54) SHIELD FOR A WIRELESS POWER TRANSMITTER

(71) Applicant: Intel Corporation, Santa Clara, CA (US)

(72) Inventors: Jaejin Lee, Hillsboro, OR (US); Chung-Hao J. Chen, Portland, OR (US); Zhen Yao, San Jose, CA (US); Songnan Yang, San Jose, CA (US); Jonathan Rosenfeld, Portland, OR (US); Sreenivas Kasturi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 15/088,277

(22) Filed: Apr. 1, 2016

(65) Prior Publication Data
US 2017/0288445 A1    Oct. 5, 2017

(51) Int. Cl.
| | |
|---|---|
| H02J 7/02 | (2016.01) |
| H02J 7/04 | (2006.01) |
| H01F 27/36 | (2006.01) |
| H01F 38/14 | (2006.01) |
| H02J 5/00 | (2016.01) |
| H02J 50/10 | (2016.01) |

(52) U.S. Cl.
CPC ............... *H02J 7/025* (2013.01); *H01F 27/36* (2013.01); *H01F 38/14* (2013.01); *H02J 5/005* (2013.01); *H02J 7/04* (2013.01); *H02J 50/10* (2016.02)

(58) Field of Classification Search
CPC ..................... H02J 7/025; H02J 7/04

USPC .......................................................... 320/108
See application file for complete search history.

(56) References Cited

U.S. PATENT DOCUMENTS

| | | | |
|---|---|---|---|
| 10,277,054 B2* | 4/2019 | Hosseini et al. | H02J 7/025 |
| 2006/0238197 A1* | 10/2006 | Vester | G01R 33/422 |
| | | | 324/318 |
| 2009/0096413 A1 | 4/2009 | Partovi et al. | |
| 2010/0039111 A1* | 2/2010 | Luekeke et al. | G01R 33/341 |
| | | | 324/318 |

(Continued)

FOREIGN PATENT DOCUMENTS

WO    2010129369 A2    11/2010

OTHER PUBLICATIONS

European Search Report for related E. P. Application 17 15 8552 with a completion date of Sep. 12, 2017, and dated Sep. 20, 2017,3 Pages.

(Continued)

*Primary Examiner* — Sun J Lin
(74) *Attorney, Agent, or Firm* — International IP Law Group, P.L.L.C.

(57) ABSTRACT

Techniques for focusing an energy radiated by a wireless power transmitting unit are described. An example power transmitting unit includes a transmit coil configured to generate a magnetic field to wirelessly power a device within an active wireless charging area. The power transmitting unit also includes a power generating circuitry to deliver a current to the transmit coil to generate the magnetic field. The power transmitting unit also includes a patch array disposed in parallel with the transmit coil to reduce a strength of the magnetic field at frequencies outside of the operating frequency during operation of the power transmitting unit.

15 Claims, 8 Drawing Sheets

(56) References Cited

U.S. PATENT DOCUMENTS

2011/0291490 A1 12/2011 Shi et al.
2016/0294225 A1* 10/2016 Blum et al. ............. H02J 5/005
2018/0287411 A1* 10/2018 Lee et al. ............. H01F 27/255

OTHER PUBLICATIONS

Cho et al., Ultra-thin Printed Circuit Board Metamaterial for High Efficiency Wireless Power Transfer, IEEE, 2015, 4 pages.
Lawson et al., Efficient Artificial Magnetic Conductor Shield for Wireless Power, IEEE, 2015, 5 pages.
Nguyen et al., Wireless Power Transfer for Mobile Devices with Consideration of Ground Effect, IEEE, 2015, 5 pages.

* cited by examiner

700

US 10,530,174 B2

SHIELD FOR A WIRELESS POWER TRANSMITTER

TECHNICAL FIELD

This disclosure relates generally to techniques for wireless power transfer. Specifically, this disclosure relates to techniques for containing the electromagnetic field generated by a wireless power transmitter.

BACKGROUND

A basic wireless power transfer system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and a PRU may include a receive (Rx) coil. In typical wireless power transfer systems, the transmit coil creates an alternating electromagnetic field and the receive coil takes power from the electromagnetic field and converts it back into electrical current to charge the battery and/or power the device.

Two common techniques for wireless power transfer are referred to as inductive charging and magnetic resonance charging. In inductive charging, the transmit and receive coils are tightly coupled and operate like two windings of a transformer. In magnetic resonance charging, the transmit and receive coils are loosely coupled and both coils are tuned to the same resonant frequency to improve efficiency. In some circumstances, the electromagnetic field generated by the transmit coil may be transmitted to areas that are outside of the wireless charging area. This energy is wasted and may interfere with other electronic components.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for containing the electromagnetic field generated by a transmit coil of a wireless charging device. As mentioned above, the electromagnetic field generated by the transmit coil may tend to be transmitted to unwanted areas in some cases. Regulatory agencies have defined regulations that limit the amount of electromagnetic energy that can be transmitted to the surroundings. One such regulation, referred to as ElectroMagnetic Compatibility (EMC), controls allowable emissions and limits ElectroMagnetic (EM) energy levels to avoid interference with other electronics. Another regulation, referred to as the Specific Absorption Ratio (SAR), specifies maximum permissible exposure of EM energy to the human body.

Recently, there have been efforts to incorporate wireless power transfer systems into desks and tables. By incorporating wireless charging pads into the tables, computing device users will have a convenient charging experience and a wire-free environment. To ensure compatibility with the SAR standards, various techniques may be used to reduce the electromagnetic radiation from the backside of the transmitting coil.

In some cases, a planar conductive sheet or passive metal loop can be disposed below the transmit coil. The planar conductive sheets induce eddy current loss and convert EM energy to heat. This approach is effective but significantly decreases the transmission efficiency of the system. The passive metal loops cancels out some the current of the coil and leads to a decrease in the EM emission. However, this technique has been relatively ineffective. Ferrite sheets having high magnetic permeability and loss can also be disposed below the transmit coil to control magnetic flux path and thereby reduce electromagnetic radiation. However, the size of such ferrite sheets makes them expensive, and the ElectroMagnetic Interference (EMI) suppression is highly dependent on the material properties of the ferrite sheets.

The present disclosure provides a technique for shielding a transmit coil. The techniques described herein maintain a high transmission efficiency for the wireless power transfer system while suppressing unwanted EMI emission from the transmit coil. The shield includes a patch array disposed below the transmit coil. The patch array is configured to appear relatively transparent to electromagnetic energy at the operating frequency of the wireless power transmission system. At other frequencies, the patch array appears more like a solid conductive sheet and reduces unwanted radiative emissions.

The techniques discussed herein may be implemented in part using a wireless charging standard protocol, such as a specification provided by Alliance For Wireless Power (A4WP), Wireless Power Consortium (WPC), and others. However, the techniques described herein may be implemented using any other wireless charging standard protocol where applicable.

Figure 1:
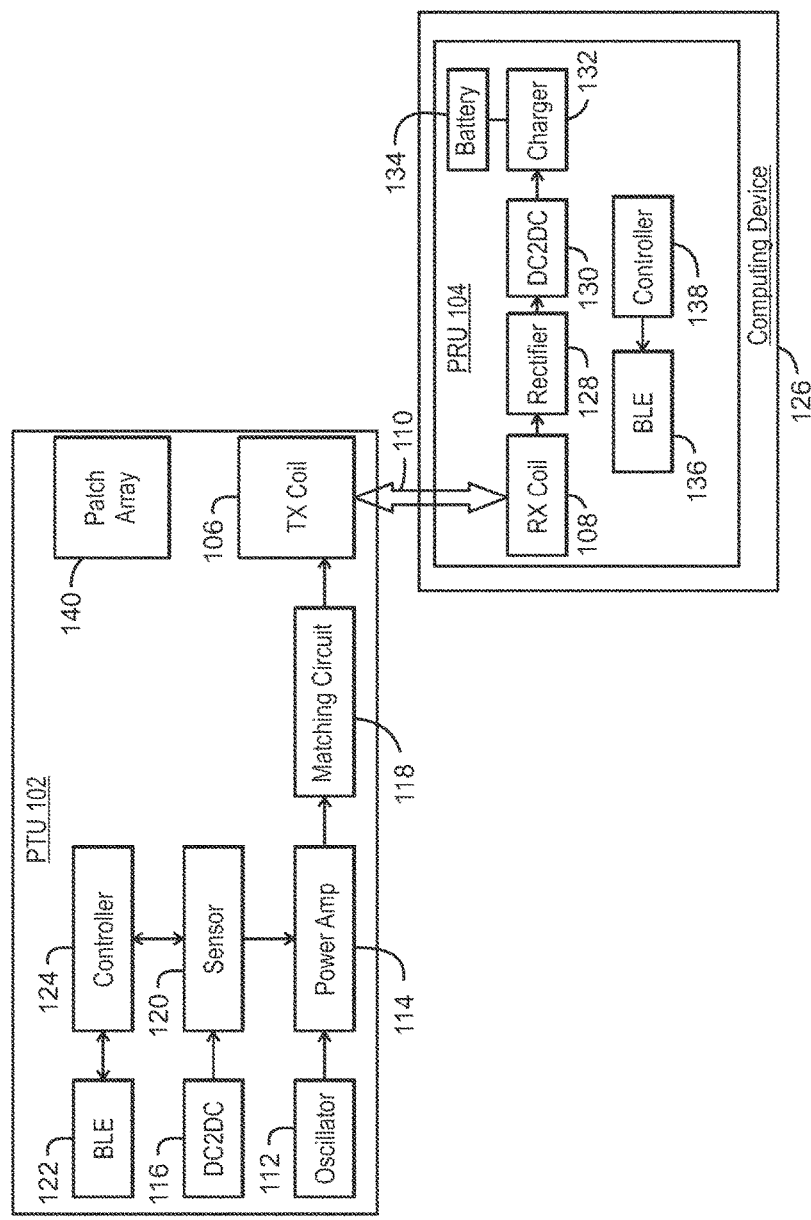
FIG. 1 is block diagram of a PTU to provide power to a PRU.

FIG. 1 is block diagram of a PTU to provide power to a PRU. A PTU 102 may be coupled to a PRU 104 via magnetic inductive coupling between two resonators referred to herein as the transmit (Tx) coil 106 and the receive (Rx) coil 108, as indicated by the arrow 110.

The PTU 102 may include an oscillator 112, a power amplifier 114, a Direct Current to Direct Current (DC2DC) converter 116, and a matching circuit 118. The oscillator 112 is configured to generate a periodic oscillating electrical signal at a specified frequency used for wireless power transfer. The specified frequency is referred to herein as the operating frequency. The power amplifier 114 receives direct current power from the DC2DC converter 116, and amplifies the signal received from the oscillator 112. The matching circuit 118 matches the impedance of the power amplifier 114 to the impedance of the transmit coil 106 to ensure efficient power transmission. The matching circuit 118 may include any suitable arrangement of electrical components such as capacitors, inductors, and other circuit elements that can be adjusted to impedance match the transmit coil 106 to the power amplifier 114. In some examples, the PTU 102 may be embedded with a desk or table.

Other components of the PTU may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. The controller 124 can be configured to control various aspects of the operation of the PTU 102. For example, the controller 124 can set a frequency, and/or power level of the power radiated by the transmit coil 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the receive coil 108. The rectifier 128 receives an alternating current (AC) voltage from the receive coil 108 and generates a rectified DC voltage (Vrect). The DC2DC converter 130 receives the rectified voltage from the rectifier 128, converts the voltage to a suitable voltage level, and provides the output to the battery charger 132. The battery 134 powers the various platform hardware of the computing device 126. The platform hardware includes the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 is configured to perform a wireless handshake with the PTU 102. As discussed above, the wireless handshake broadcast may be performed through the BLE modules 122 and 136 or other wireless data transmission component. Various types of information may be transmitted during the wireless handshake, including power budget, wireless charging capabilities, size of the computing device 126, and other information.

The PTU 102 also includes a patch array shield 104 disposed in proximity to the transmit coil 106. The patch array is frequency selective. Specifically, the patch array appears relatively transparent to electromagnetic energy radiated at the operating frequency. This reduces the effects of the patch array on the desired electromagnetic transmissions. At other frequencies, the patch array appears more like a solid conductive sheet and reduces unwanted radiative emissions. Some examples of patch arrays in accordance with the present techniques are described further below in relation to FIGS. 2 and 3.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
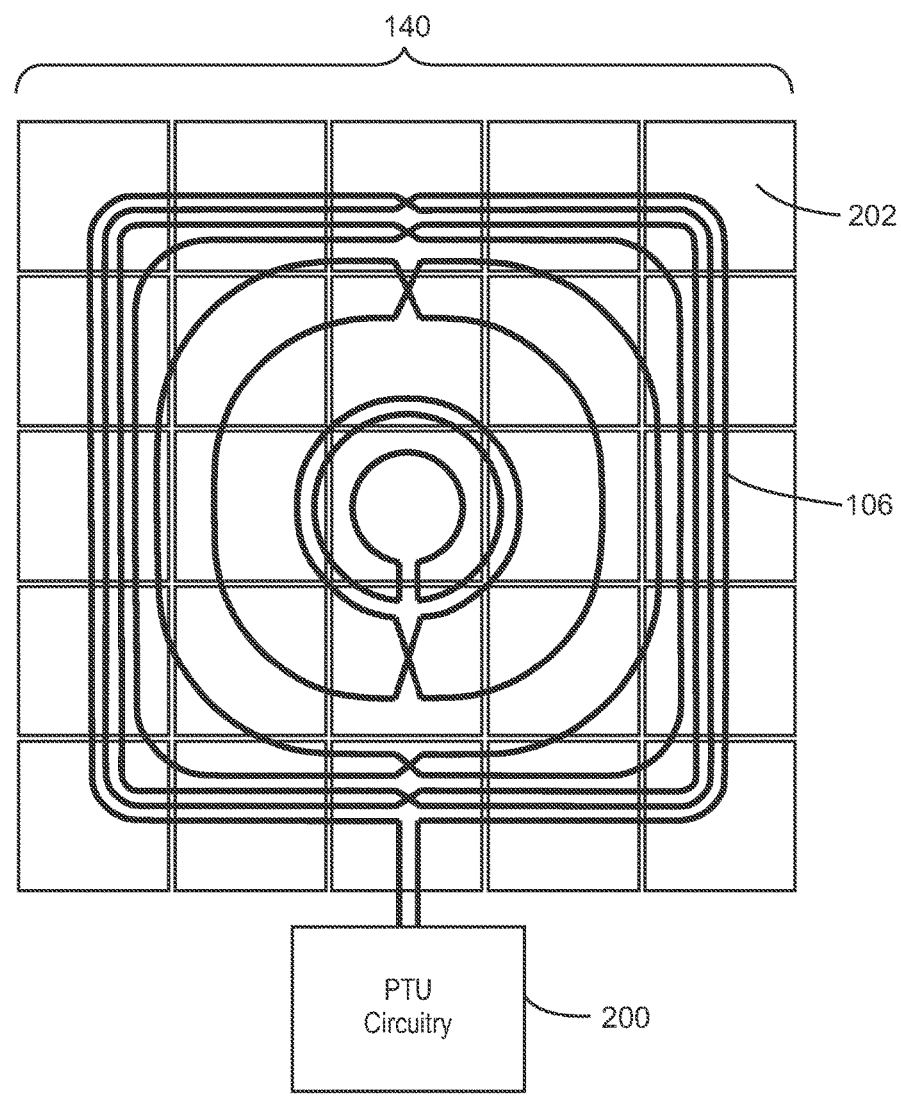
FIG. 2 is one example of a transmit coil shielded by a patch array.

FIG. 2 is one example of a transmit coil shielded by a patch array. The transmit coil 106 can include one or more conductive turns configured to receive current from the PTU circuitry 200. The PTU circuitry 200 may include the components described in relation to FIG. 1, such as the oscillator 112, the power amplifier 114, the DC2DC converter 116, the matching circuit 118, and others. Current flowing on the conductive turns generates the magnetic field used for wireless charging. The transmit coil shown in FIG. 2 includes several turns spaced at specific distances. The number of turns, the shape of the turns, and the spacing between the turns may be selected to focus the electromagnetic field within the active charging area. However, the specific arrangement shown in FIG. 1 is not a limitation of the present techniques. The current techniques can be implemented using any suitable type of transmit coil with any number, shape, or spacing of turns.

In relation to the transmit coil 106, there is a defined area above the transmit coil referred to herein as the active charging area. The active charging area is where PRUs 104 are supposed to be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be about equal to the area bounded by transmit coil or the outer turn if there is more than one.

Below the transmit coil is a patch array 140, which includes a plurality of conductive patches 202 arranged side-by-side below and parallel to the transmit coil. The patch array 140 is configure to reduce electromagnetic energy below the transmit coil (the direction into the page). The patch array 140 is frequency selective, meaning that its electrical characteristics are different at different frequencies. At the operating frequency, the patch array 140 behaves more transparently to the electromagnetic energy, which reduces the degradation of the magnetic field above the transmit coil 106 at the operating frequency. At other frequencies, the patch array 140 behaves more like a solid conductor and thus reduces the magnetic field above and below the patch array 140 and the transmit coil 106 at frequencies other that the operating frequency.

The frequency selectivity may be accomplished by coupling the patches 202 to one another with a specific inductance and capacitance to create a parallel LC resonant circuit between each patch 202. In some examples, the LC circuit is created using inductors and capacitors as discrete circuit elements. In some examples, the LC circuit is created by the patch array's structure, such as the spacing between the patches 202 and other factors. Some examples of frequency selectivity patch arrays are described further in relation to FIGS. 3-5.

Figure 3:
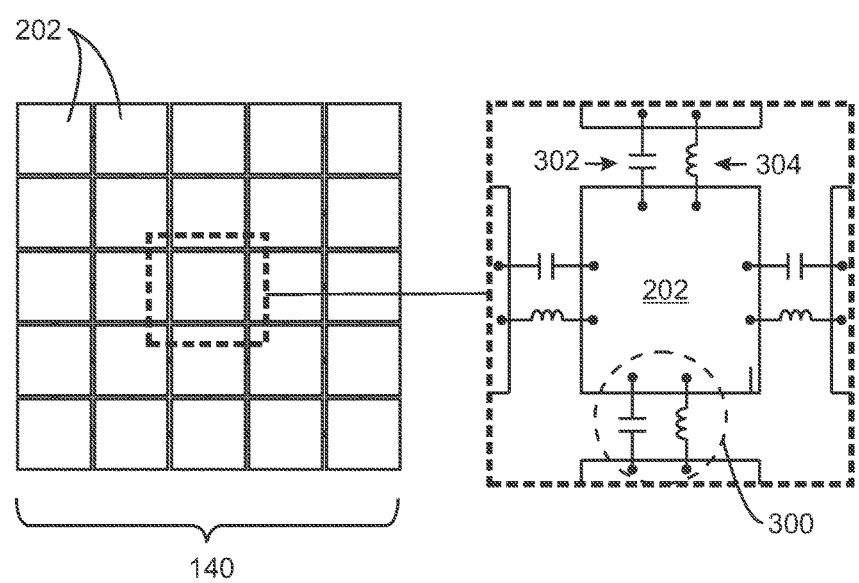
FIG. 3 is an example of a patch array that can be used for shielding a transmit coil.

FIG. 3 is an example of a patch array that can be used for shielding a transmit coil. The patch array 140 shown in FIG. 3 includes an array of rectangular conductive patches 202 with gaps between the patches 202. Each patch 202 is a flat panel of conductive material, such as aluminum, copper, other metals, and conductive polymers. Each patch 202 is coupled to the adjacent patches 202 through an LC circuit 300 that spans the gap between the patches 202. Each LC circuit 300 includes a capacitive element 302 and an inductive element 304 connected in parallel across a respective gap and bridging the gap. The values of the capacitive element 302 and the inductive element 304 can be selected so that the resonant frequency of the LC circuits 300 is the operating frequency of the wireless power transfer system.

In some examples, the operating frequency of the wireless power transfer system will be about 6.78 MHz.

At the operating frequency, high impedance is created by the resonance of the parallel LC circuit 300, which prevents current from flowing between the patches. This causes the current induced on the patch array 140 by the transmit coil to be noncontinuous. At other frequencies, the current can flow through the patches 202 due to low impedance. The induced current on the patch array 140 becomes continuous and causes a decrease in the current intensity at the transmit coil. In this way, unintentional radiation can be effectively suppressed with the frequency-selective patch array 140.

The dimensions of the patch array 140 can be determined experimentally and will depend on the desired operating frequency. For an operating frequency of 6.78 MHz, one example of a patch array 140 may include an array of 25 square patches, each of which is about 50 millimeters (mm) on a side. The gap between patches 202 may be about 2 mm. These example dimensions result in a patch array 140 that is about 258 millimeters by 258 millimeters. The number of patches 202 may be increased or decreased to be suitable for the size of the transmit coil being shielded. The patch array 140 may be equal to or larger that the area covered by the transmit coil. Furthermore, the patch array 140 will be disposed above or below the conductive turns of the transmit coil. In an example in which the patch array 140 includes only a single turn, the patch array 140 may be limited to an outer perimeter of patches 202 that generally follows the contour of the single turn.

Figure 4A:
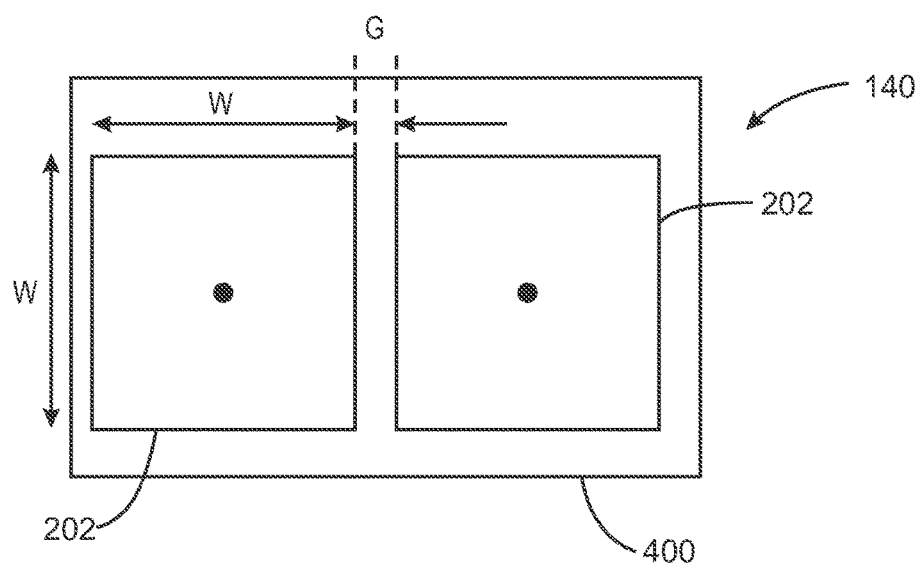
FIGS. 4A and 4B show another example of a patch array that can be used for shielding a transmit coil.
Figure 4B:
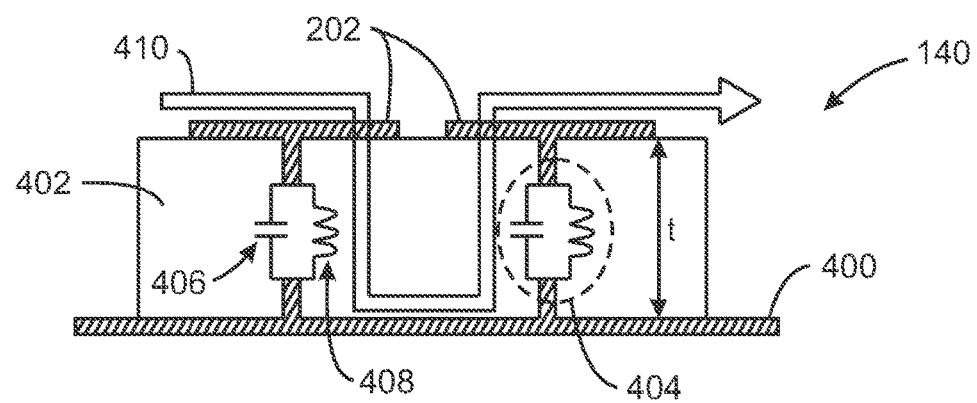

FIGS. 4A and 4B show another example of a patch array 140 that can be used for shielding a transmit coil. FIG. 4A shows a top view of the patch array 140, and FIG. 4B shows a side view of the patch array 140. The patch array 140 includes an array of rectangular conductive patches with gaps between the patches. For the sake of simplicity, only two patches are shown. However, it will be appreciated that the patch array 140 can include any suitable number of patches, depending on the area of the transmit coil to be shielded.

The example patch array 140 also includes a bottom ground plane 400 with a vertical conductor coupling the each patch 202 to the ground plane 400. The patches 202 are separated from the bottom plane 400 by an insulating layer 402. Examples of suitable materials for the insulating layer 402 include FR4, polyimide, ferrite, and other non-conductive dielectric and magnetic materials. In some examples, each patch 202 may also be coupled to the ground plane 400 through an LC circuit 404 that includes a capacitive element 406 and an inductive element 408 connected in parallel between the patches 202 and the ground plane 400. In some examples, the patch array 140 coupled directly to the ground plane 400 through a conductor and the inductive and capacitive elements may be omitted. In such examples, an equivalent lumped inductance and lumped capacitance equivalent to the capacitive element 406 and the inductive element 408 shown in FIG. 4B may be achieved by patch array's structure.

The electrical characteristics of the patch array 140 can be determined, in part, by the geometry of the patch array 140, such as thickness, t, of the insulating layer, the width, w, of the patches, and the gap, g, between the patches. The electrical characteristics of the patch array 140 will also be determined, in part, by the dielectric constant, $\varepsilon_r$, and magnetic constant, $\mu_r$, of the material used for the insulating layer 402.

The electrical current through the patch array 140 is shown by the line 410 in FIG. 4B. At the resonant frequency of the LC circuit 404, high impedance of the LC circuit 404 blocks the current flow. On the other hand, low impedance of the LC circuit 404 at frequencies other than the resonant frequency allows the current flow. These frequency-selective characteristics of the resonant patch array 140 suppress EMI emissions over the broad band while still enabling large intentional radiation at the operating frequency. Furthermore, the solid ground plane 400 provides a more effective shield for radiative emissions below the patch array 140.

Figure 5:
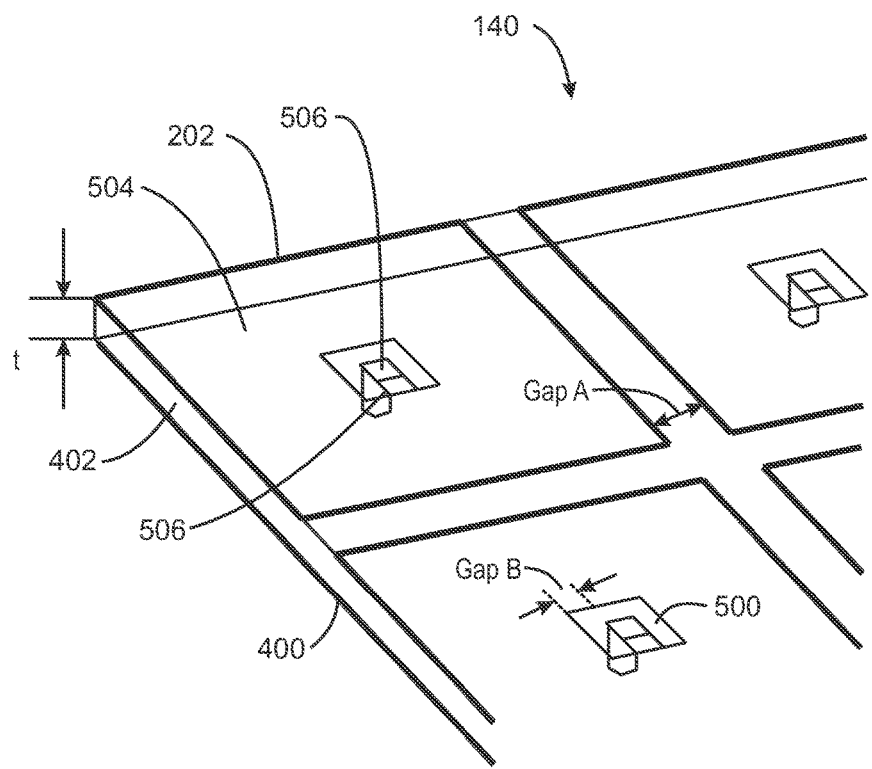
FIG. 5 is a top perspective view of a portion of another example patch array that can be used for shielding a transmit coil.

FIG. 5 is a top perspective view of a portion of another example patch array that can be used for shielding a transmit coil. As before, the patch array 140 includes an array of rectangular conductive patches 202 with gaps between the patches (Gap A). For the sake of simplicity, only a portion of the patch array 140 is shown. However, it will be appreciated that the patch array 140 can include any suitable number and size of patches 202, depending on the area of the transmit coil to be shielded.

The example patch array 140 also includes a bottom ground plane 400, which may be separated from the patches 202 by an insulating layer 402. A conductive via 500 through the insulating layer 402 couples each patch 202 to the ground plane 400. In the example shown in FIG. 5, each patch 202 includes an opening 502 that surrounds the via 500 and creates a gap between the via 500 and the inside perimeter of the patch (Gap B). Each patch 202 can be made up of an outer patch 504 and an inner patch 506 disposed inside the opening 500 and coupled to the via 502. The outer patch 504 is coupled to the via 502 (and therefore the ground plane 400) through an LC circuit 506 that bridges the gap between the between the via 502 and the outer patch 504. The LC circuit 506 can include an inductive circuit element and a capacitive circuit element connected in parallel.

The electrical characteristics of the patch array 140 can be determined, in part, by the geometry of the patch array 140, such as thickness, t, of the insulating layer 402, the gap between the patches (Gap A), and the internal gap separating the patch from the via (Gap B). The electrical characteristics of the patch array 140 will also be determined, in part, by the dielectric constant, $\varepsilon_r$, and magnetic constant, $\mu_r$, of the material used for the insulating layer 402, and the inductance and capacitance values selected for the LC circuit 506.

Figure 6:
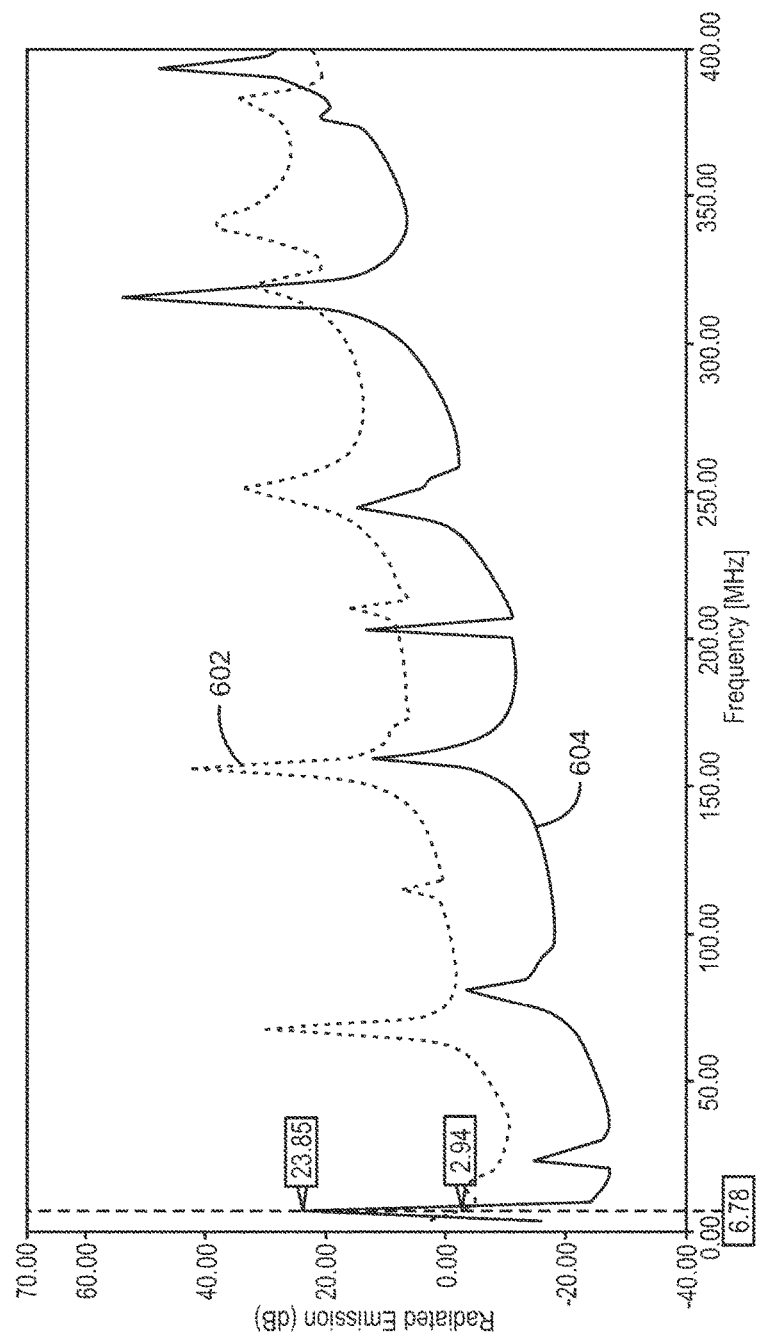
FIG. 6 is a logarithmic graph of the radiated emission of a shielded transmit coil.

FIG. 6 is a logarithmic graph of the radiated emission of a shielded transmit coil. More specifically, the graph of FIG. 6 represents simulated field values for a transmit coil shielded using the patch array of FIG. 5. The dashed line 602 represents the transmit coil alone, with no shielding. The solid line 604 represents the transmit coil with shielding.

As demonstrated by the graph 600, the transmitting coil with the patch array generates a high level of intentional radiative emissions at the operating frequency of 6.78 MHz. Specifically, the radiated power at 6.78 MHz is 23.8 dB with the patch array compared to −2.94 dB without the patch array. By contrast, unintentional radiative emissions at other frequencies are considerably suppressed up to about 400 MHz. The results indicate that the patch array has greatly reduced the unintentional radiative emissions, which can help improve compliance with electromagnetic compatibility standards. Furthermore, although not represented in the graph, the continuous ground plane below the patch array almost completely eliminates the radiative emissions below the patch array at all frequencies including the operating frequency. In certain implementations, such as table top or desk top implementations, eliminating radiative emissions below the transmit coil helps to improve compliance with specific absorption ratio standards.

Figure 7:
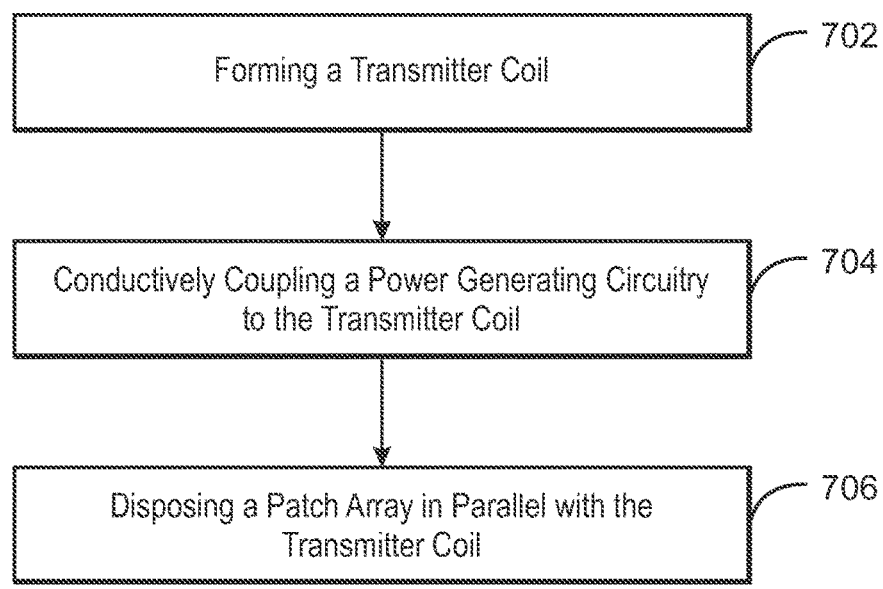
FIG. 7 is a process flow diagram of a method of manufacturing a transmit coil with a patch array shield.

FIG. 7 is a process flow diagram of a method of manufacturing a transmit coil with a patch array shield. The method may begin at block 702.

At block 702, a transmit coil is formed. The transmit coil is configured to generate a magnetic field to wirelessly power a device within an active wireless charging area. The transmit coil includes at least one turn, and can also include several turns. The dimensions of the turns may be selected to focus the magnetic energy within the active charging area.

At block 704, a power generating circuitry is conductively coupled to the transmit coil. The power generating circuitry is configured to deliver current to the transmit coil to generate the magnetic field at a desired frequency.

At block 704, a patch array is disposed in proximity to the transmit coil. The patch array may be disposed in parallel to the transmit coil either above or below the transmit coil. In some examples, disposing the patch array below the transmit coil will help to further focus the energy to the active charging area above the coil. The patch array is configured to reduce the strength of the magnetic field generated by the transmit coil at frequencies outside of the operating frequency during operation of the power transmitting unit. The patch array may also be configured to reduce the strength of the magnetic field in a particular direction. For example, if the patch array includes a ground plane as in FIG. 6, placing the patch array below the transmit coil will reduce the strength of the magnetic field below the transmit coil at substantially all frequencies.

The patch array may be any suitable frequency selective patch array, including one of the patch arrays shown in FIGS. 2-5. The patch array may be an array of conductive patches disposed below the transmit coil. Each of the rectangular conductive patches may be coupled to an adjacent conductive patch of the patch array though a resonant circuit, such as an LC circuit that includes a capacitor and an inductor in parallel.

The patch array can also include an array of conductive patches each of which is coupled to a solid ground plane disposed in parallel with the conductive patches. The conductive patches may be separated from the ground plane by an insulating material and conductively coupled to the ground plane by a conductive via through the insulating material. In some examples, each of the conductive patches may include an outer patch that is separated from the via by a gap and conductively coupled to the via through an LC circuit. The power transmitting unit may be incorporated into a table top.

The method 700 should not be interpreted as meaning that the blocks are necessarily performed in the order shown. Furthermore, fewer or greater actions can be included in the method 700 depending on the design considerations of a particular implementation.

EXAMPLES

Example 1 is a power transmitting unit. The power transmitting unit includes a transmit coil configured to generate a magnetic field to wirelessly power a device within an active wireless charging area; a power generating circuitry to deliver current to the transmit coil to generate the magnetic field at an operating frequency; and a patch array disposed in parallel with the transmit coil to reduce a strength of the magnetic field at frequencies outside of the operating frequency during operation of the power transmitting unit.

Example 2 includes the power transmitting unit of example 1, including or excluding optional features. In this example, the patch array comprises an array of conductive patches disposed below the transmit coil.

Example 3 includes the power transmitting unit of any one of examples 1 to 2, including or excluding optional features. In this example, each of the conductive patches is coupled to an adjacent conductive patch of the patch array through a resonant circuit.

Example 4 includes the power transmitting unit of any one of examples 1 to 3, including or excluding optional features. In this example, the resonant circuit comprises an LC circuit comprising a capacitor and an inductor in parallel.

Example 5 includes the power transmitting unit of any one of examples 1 to 4, including or excluding optional features. In this example, the patch array comprises array of conductive patches coupled to a ground plane disposed in parallel with the conductive patches.

Example 6 includes the power transmitting unit of any one of examples 1 to 5, including or excluding optional features. In this example, the conductive patches are separated from the ground plane by an insulating material and conductively coupled to the ground plane by a via through the insulating material.

Example 7 includes the power transmitting unit of any one of examples 1 to 6, including or excluding optional features. In this example, the conductive patches comprise an outer patch separated from the via by a gap, wherein the outer patch is conductively coupled to the via through an LC circuit.

Example 8 includes the power transmitting unit of any one of examples 1 to 7, including or excluding optional features. In this example, the power transmitting unit is built into a table top.

Example 9 is a method of manufacturing a power transmitting unit. The method includes forming a transmit coil configured to generate a magnetic field to wirelessly power a device within an active wireless charging area; conductively coupling a power generating circuitry to the transmit coil, the power generating circuitry to deliver current to the transmit coil to generate the magnetic field at an operating frequency; and disposing a patch array in parallel with the transmit coil to reduce a strength of the magnetic field at frequencies outside of the operating frequency during operation of the power transmitting unit.

Example 10 includes the method of example 9, including or excluding optional features. In this example, the patch array comprises an array of conductive patches disposed below the transmit coil.

Example 11 includes the method of any one of examples 9 to 10, including or excluding optional features. In this example, each of the conductive patches is coupled to an adjacent conductive patch of the patch array through a resonant circuit.

Example 12 includes the method of any one of examples 9 to 11, including or excluding optional features. In this example, the resonant circuit comprises an LC circuit comprising a capacitor and an inductor in parallel.

Example 13 includes the method of any one of examples 9 to 12, including or excluding optional features. In this example, the patch array comprises array of conductive patches coupled to a ground plane disposed in parallel with the conductive patches.

Example 14 includes the method of any one of examples 9 to 13, including or excluding optional features. In this example, the conductive patches are separated from the ground plane by an insulating material and conductively coupled to the ground plane by a via through the insulating material.

Example 15 includes the method of any one of examples 9 to 14, including or excluding optional features. In this example, the conductive patches comprise an outer patch separated from the via by a gap, wherein the outer patch is conductively coupled to the via through an LC circuit.

Example 16 includes the method of any one of examples 9 to 15, including or excluding optional features. In this example, the method includes disposing the power transmitting unit into a table top.

Example 17 is a wireless charger. The wireless charger includes a transmit coil configured to generate a magnetic field to wirelessly power a device within an active wireless charging area; a power generating circuitry to deliver current to the transmit coil to generate the magnetic field at an operating frequency; and a patch array disposed in parallel with the transmit coil to reduce a strength of the magnetic field at frequencies outside of the operating frequency during operation of the wireless charger.

Example 18 includes the wireless charger of example 17, including or excluding optional features. In this example, the patch array comprises an array of conductive patches disposed below the transmit coil.

Example 19 includes the wireless charger of any one of examples 17 to 18, including or excluding optional features. In this example, each of the conductive patches is coupled to an adjacent conductive patch of the patch array through a resonant circuit.

Example 20 includes the wireless charger of any one of examples 17 to 19, including or excluding optional features. In this example, the resonant circuit comprises an LC circuit comprising a capacitor and an inductor in parallel.

Example 21 includes the wireless charger of any one of examples 17 to 20, including or excluding optional features. In this example, the patch array comprises array of conductive patches coupled to a ground plane disposed in parallel with the conductive patches.

Example 22 includes the wireless charger of any one of examples 17 to 21, including or excluding optional features. In this example, the conductive patches are separated from the ground plane by an insulating material and conductively coupled to the ground plane by a via through the insulating material.

Example 23 includes the wireless charger of any one of examples 17 to 22, including or excluding optional features. In this example, the conductive patches comprise an outer patch separated from the via by a gap, wherein the outer patch is conductively coupled to the via through an LC circuit.

Example 24 includes the wireless charger of any one of examples 17 to 23, including or excluding optional features. In this example, the wireless charger is disposed within a table top.

Example 25 is an apparatus for wirelessly transmitting power to a power receiving device. The apparatus includes means for generating a magnetic field to wirelessly power a device within an active wireless charging area; means for delivering current at an operating frequency to the means for generating the magnetic field; and means for reducing a strength of the magnetic field at frequencies outside of the operating frequency during operation of the power transmitting unit.

Example 26 includes the apparatus of example 25, including or excluding optional features. In this example, the means for reducing a strength of the magnetic field comprises an array of conductive patches disposed below the transmit coil.

Example 27 includes the apparatus of any one of examples 25 to 26, including or excluding optional features. In this example, each of the conductive patches is coupled to an adjacent conductive patch of the patch array through a resonant circuit.

Example 28 includes the apparatus of any one of examples 25 to 27, including or excluding optional features. In this example, the resonant circuit comprises an LC circuit comprising a capacitor and an inductor in parallel.

Example 29 includes the apparatus of any one of examples 25 to 28, including or excluding optional features. In this example, the means for reducing a strength of the magnetic field comprises an array of conductive patches coupled to a ground plane disposed in parallel with the conductive patches.

Example 30 includes the apparatus of any one of examples 25 to 29, including or excluding optional features. In this example, the conductive patches are separated from the ground plane by an insulating material and conductively coupled to the ground plane by a via through the insulating material.

Example 31 includes the apparatus of any one of examples 25 to 30, including or excluding optional features. In this example, the conductive patches comprise an outer patch separated from the via by a gap, wherein the outer patch is conductively coupled to the via through an LC circuit.

Example 32 includes the apparatus of any one of examples 25 to 31, including or excluding optional features. In this example, the apparatus is built into a table top.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A power transmitting unit, comprising:
   a transmit coil configured to generate a magnetic field to wirelessly power a device within an active wireless charging area;
   a power generating circuitry to deliver a current to the transmit coil to generate the magnetic field at an operating frequency; and
   a patch array disposed in parallel with the transmit coil to reduce a strength of the magnetic field at frequencies outside of the operating frequency during operation of the power transmitting unit;
   wherein the patch array comprises an array of conductive patches coupled to a ground plane disposed in parallel with the array of conductive patches;
   wherein the array of conductive patches are separated from the ground plane by an insulating material and conductively coupled to the ground plane by a via through the insulating material; and
   wherein the array of conductive patches comprise an outer patch separated from the via by a gap, wherein the outer patch is conductively coupled to the via through an LC circuit.

2. The power transmitting unit of claim 1, wherein the array of conductive patches is disposed below the transmit coil.

3. The power transmitting unit of claim 1, wherein each conductive patch of the array of conductive patches is coupled to an adjacent conductive patch of the patch array through a resonant circuit.

4. The power transmitting unit of claim 1, wherein the LC circuit comprising a capacitor and an inductor connected in parallel.

5. The power transmitting unit of claim 1, wherein the power transmitting unit is built into a table top.

6. A method of manufacturing a power transmitting unit, the method comprising:
   forming a transmit coil configured to generate a magnetic field to wirelessly power a device within an active wireless charging area;
   conductively coupling a power generating circuitry to the transmit coil, the power generating circuitry to deliver a current to the transmit coil to generate the magnetic field at an operating frequency; and
   disposing a patch array in parallel with the transmit coil to reduce a strength of the magnetic field at frequencies outside of the operating frequency during operation of the power transmitting unit;
   wherein the patch array comprises an array of conductive patches coupled to a ground plane disposed in parallel with the array of conductive patches;
   wherein the patch array comprises an array of conductive patches coupled to a ground plane disposed in parallel with the array of conductive patches; and
   wherein the array of conductive patches are separated from the ground plane by an insulating material and conductively coupled to the ground plane by a via through the insulating material.

7. The method of claim 6, wherein the array of conductive patches is disposed below the transmit coil.

8. The method of claim 6, wherein each conductive patch of the array of conductive patches is coupled to an adjacent conductive patch of the patch array through a resonant circuit.

9. The method of claim 6, wherein the LC circuit comprising a capacitor and an inductor connected in parallel.

10. The method of claim 6, comprising disposing the power transmitting unit into a table top.

11. A wireless charger, comprising:
    a transmit coil configured to generate a magnetic field to wirelessly power a device within an active wireless charging area;
    a power generating circuitry to deliver a current to the transmit coil to generate the magnetic field at an operating frequency; and
    a patch array disposed in parallel with the transmit coil to reduce a strength of the magnetic field at frequencies outside of the operating frequency during operation of the wireless charger;
    wherein the patch array comprises an array of conductive patches coupled to a ground plane disposed in parallel with the array of conductive patches;
    wherein the array of conductive patches are separated from the ground plane by an insulating material and conductively coupled to the ground plane by a via through the insulating material; and
    wherein the array of conductive patches comprise an outer patch separated from the via by a gap, wherein the outer patch is conductively coupled to the via through an LC circuit.

12. The wireless charger of claim 11, wherein the array of conductive patches is disposed below the transmit coil.

13. The wireless charger of claim 11, wherein each conductive patch of the array of conductive patches is coupled to an adjacent conductive patch of the patch array through a resonant circuit.

14. The wireless charger of claim 11, wherein the LC circuit comprising a capacitor and an inductor connected in parallel.

15. The wireless charger of claim 11, wherein the wireless charger is disposed within a table top.

* * * * *